Patented Mar. 4, 1941

2,233,391

UNITED STATES PATENT OFFICE 2,233,391

ACID WOOL DYESTUFFS OF THE ANTHRAQUINONE SERIES AND A PROCESS OF PREPARING THEM

Hans Becker, Hofheim in Taunus, Germany, assignor to General Aniline & Film Corporation, a corporation of Delaware No Drawing. Application January 17, 1939, Serial No. 251,317. In Germany February 11, 1938

10 Claims. (Cl. 260—344)

The present invention relates to acid wool dyestuffs of the anthraquinone series and to a process of preparing them.

I have found that acid wool dyestuffs of the anthraquinone series, for instance acid wool dyestuffs of the general formula:

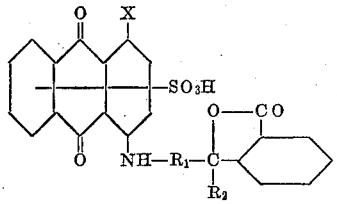

wherein X represents a member of the group consisting of hydrogen and amino, $R_1$ represents an aryl radical of the benzene and diphenyl series, and $R_2$ represents the radical of compounds of the group consisting of aromatic hydrocarbons, their homologues and alkoxy substitution products, are obtained by condensing by means of sulfuric acid an ortho-(anthraquinonyl-aminoaroyl)-aryl carboxylic acid containing a sulfogroup, for instance of the following general formula:

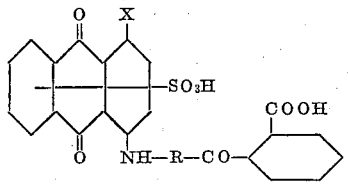

wherein X represents a member of the group consisting of hydrogen and amino, and R represents an aryl radical of the benzene and diphenyl series, with an aromatic hydrocarbon or one of its homologues or substitution products. The condensation is suitably carried out by stirring the reaction components for some hours in the presence of concentrated sulfuric acid, at a temperature of about 0° C. to 25° C. The ortho-(anthraquinonylamino-aroyl)-arylcarboxylic acids containing a sulfo-group, which are used as starting materials can be obtained by condensing in known manner a halogen-anthraquinone-sulfonic acid with an amino derivative of an ortho-aroyl-aryl-carboxylic acid.

Suitable halogen-anthraquinone-sulfonic acids are, for instance:

1-halogen-anthraquinone-2-sulfonic acid,
1-halogen-anthraquinone-3-sulfonic acid,
1-amino-4-halogen-anthraquinone-2-sulfonic acid,
1-amino-anthraquinone-4-halogen-2,6-disulfonic acid,
1-4-dihalogen-anthraquinone-6-sulfonic acid.

These halogen-anthraquinone-sulfonic acids may contain as substituents in the non-halogenated nucleus halogen, sulfonic acid, amino, acylamino, methoxy-acylamino groups and the like.

The amino-group of the amino derivatives of ortho-aroyl-aryl-carboxylic acids used for preparing the starting materials may be present either in the aroyl radical or in the aryl radical or also in both of them. As starting materials, therefore, there may also be used such as are formed by condensation of a diamino-compound as defined above with 2 mols of a halogen-anthraquinone-sulfonic acid. The aryl and aroyl-radical of the base may, furthermore, contain any substituent of 1st or 2nd order. Aryl is to be understood as comprising higher condensed ring systems while aryl of the benzene series covers the benzene radical and the substituted benzene radical.

Aromatic hydrocarbons which may be used in the condensation according to the present invention are, for instance, benzene and its homologues containing one or more aryl groups, further homologues with branched or straight chains of any length. Ring homologues, as for instance, naphthalene or phenanthrene may also be subjected to this condensation. These hydrocarbons may contain as substituents one or more halogen atoms, hydroxy, alkyl and aryl-oxygroups.

The following examples serve to illustrate the invention, but they are not intended to limit it thereto; the parts are by weight:

(1) 10 parts of the condensation product from 1-amino-4-bromo-anthraquinone-2-sulfonic acid and 3'-amino-4'-methyl-ortho-benzoylbenzoic acid are dissolved, while stirring, in 100 parts of concentrated sulfuric acid; the solution is cooled to 10° C. and 10 parts of benzene are added thereto. The whole is stirred for 1 to 2 hours, without further cooling; the temperature rises to room temperature and the excess of benzene is converted into the corresponding sulfonic acid. The whole is poured on ice, whereupon dark blue flakes separate; the whole is filtered with suction and the precipitate obtained is, if desired, dissolved in hot water or dilute alkali solution, hydrochloric acid is added and the precipitate obtained after filtering with suction is washed with dilute hydrochloric acid. The condensation product formed dyes wool clear and very fast blue tints.

(2) 1-amino-4-bromanthraquinone-2-sulfonic acid is condensed by the process of U. S. Patent No. 1,902,083 with 3'-amino-4'-methyl-o-benzoyl-benzoic acid; 20 parts of the product thus obtained are dissolved in ten times their weight of concentrated sulfuric acid. 20 parts of toluene are dropped, while stirring, into the solution cooled to 5° C. and the whole is further stirred, for 2 hours within which the temperature is allowed to rise to about 20° C. The batch is poured on ice and the dyestuff which separates in the form of dark blue flakes is isolated by filtering with suction. It is, for purification, dissolved in dilute ammonia, the solution is filtered and the dyestuff precipitated by means of dilute hydrochloric acid; the dyestuff which dyes wool clear blue tints is distinguished by very good properties of fastness. The dyestuff thus obtained has the following probable constitution:

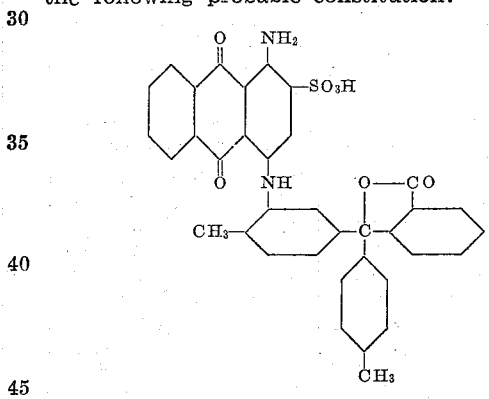

Ortho-, meta- and para-xylene, mesitylene and others may, in the same manner as toluene, be condensed by means of sulfuric acid.

(3) 10 parts of the condensation product from 1-amino-4-bromanthraquinone-2-sulfonic acid and 3'-amino-4'-methyl-ortho-benzoyl-benzoic acid are, while stirring, dissolved in 100 parts of concentrated sulfuric acid, and a solution of 3 parts of naphthalene in 10 parts of nitrobenzene is added at about 10° C. The whole is stirred for one hour at 20° C. and poured on ice, the nitrobenzene is expelled by introduction of steam and the whole is, after cooling, filtered with suction. Analysis proves that, besides the condensation, sulfonation has occurred.

(4) 10 parts of the condensation product from 1-amino-4-bromanthraquinone-2-sulfonic acid and 3'-amino-4'-methyl-ortho-benzoyl-benzoic acid are dissolved in 100 parts of concentrated sulfuric acid, 5 parts of n-dodecylbenzene are then dropped in and the whole is stirred, for 2 hours, at 20° C. The product is worked up as described in Example 1. It dyes wool reddish blue tints of good fastness properties.

A similar dyestuff is obtained by using n-tetradecylbenzene instead of n-dodecylbenzene.

(5) 10 parts of the condensation product from 1-amino-4-bromanthraquinone-2-sulfonic acid and 3'-amino-4'-methyl-ortho-benzoyl-benzoic acid are dissolved in 100 parts of concentrated sulfuric acid; 10 parts of anisol are then added and the whole is stirred, for one hour, at 20° C. The product is worked up as described in Example 1. It dyes wool greenish blue tints with good properties of fastness to water, washing and light.

Instead of anisol, there may be condensed, in the same manner, the dimethyl ether of pyrocatechol, of resorcinol or hydroquinone.

(6) 20 parts of the condensation product from 1-amino-4-bromanthraquinone-2-sulfonic acid and 3'-amino-4'-methyl-ortho-benzoyl-benzoic acid are dissolved, while stirring, in 150 parts of concentrated sulfuric acid, and 20 parts of hydroquinone di-n-butyl ether are added at 0° C. The whole is further stirred for 2 hours within which the temperature is allowed to rise to 25° C. The dyestuff is precipitated by pouring the whole on ice. It is then isolated by filtering with suction and washed with dilute hydrochloric acid. The properties of fastness of the dyestuff, which dyes wool blue tints, are very good. The dyestuff thus obtained has the following probable constitution:

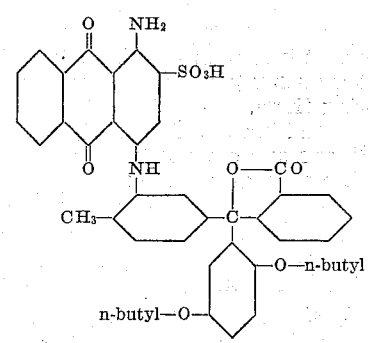

(7) 10 parts of the condensation product from 1-amino-4-bromanthraquinone-2-sulfonic acid and 3'-amino-4'-methoxy-ortho-benzoyl-benzoic acid are combined with toluene as described in Example 1. After working up the product as usual, a blue acid wool dyestuff with very good properties of fastness is obtained.

(8) 10 parts of the condensation product from 1-amino-4-iodo-anthraquinone-2.6-disulfonic acid and 3'-amino-4'-methoxy-ortho-benzoyl-benzoic acid are dissolved in 100 parts of concentrated sulfuric acid; 10 parts of toluene are dropped in and the whole is stirred, for 2 hours, at 20° C. The product is worked up as described in Example 1.

(9) 10 parts of the condensation product from 1-amino-4-bromanthraquinone-2-sulfonic acid and 4''-amino-4'-phenyl-ortho-benzoyl-benzoic acid are dissolved in 100 parts of concentrated sulfuric acid; the whole is, after addition of 100 parts of toluene, stirred for 2 hours and the batch is worked up as described in Example 1. An acid dyestuff is obtained which dyes wool greenish blue tints.

(10) 10 parts of the condensation product from 1-iodo-anthraquinone-2-sulfonic acid and 3'-amino-4'-methoxy-ortho-benzoyl-benzoic acid are dissolved in 100 parts of concentrated sulfuric acid and stirred, for one hour at 20° C. with 10 parts of toluene. After working up the batch as described in Example 1, a substance is obtained which dyes animal fiber red tints.

In an analogous manner, the condensation product from 1-bromanthraquinone-3-sulfonic acid and 3'-amino-4'-methoxy-ortho-benzoyl-benzoic acid may be caused to react, in concentrated sulfuric acid, with toluene. The dyestuff thus obtained, likewise, dyes wool red tints.

(11) 3′,4′-diamino-ortho-benzoyl-benzoic acid is condensed by the process of U. S. Patent No. 2,129,141 with 1-bromanthraquinone-2-sulfonic acid. 15 parts of the product obtained are dissolved in 15 times their weight of concentrated sulfuric acid and 15 parts of toluene are gradually added thereto. After a two hours' stirring at room temperature, the whole is poured into water and the brown flakes which separate are isolated by filtering with suction. The dyestuff obtained dyes wool brown tints.

I claim:

1. The process which comprises condensing a compound of the group consisting of aromatic hydrocarbons, their homologues and alkoxy substitution products at a temperature between zero and about 25° C. in the presence of concentrated sulfuric acid with a compound of the general formula:

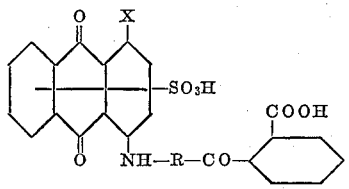

wherein X represents a member of the group consisting of hydrogen and amino, and R represents an aryl radical of the benzene and diphenyl series.

2. The process which comprises condensing a compound of the group consisting of aromatic hydrocarbons, their homologues and alkoxy substitution products at a temperature between zero and about 25° C. in the presence of concentrated sulfuric acid with the compound of the formula:

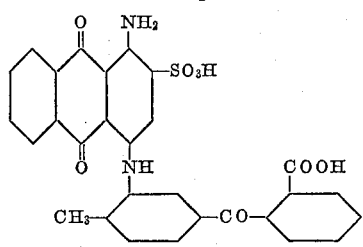

3. The process which comprises condensing toluene at a temperature of between 5° C. and 20° C. with the compound of the formula:

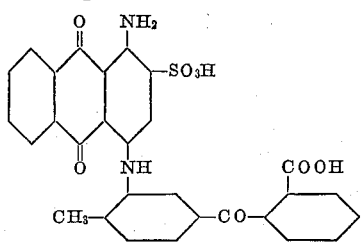

which is dissolved in concentrated sulfuric acid.

4. The process which comprises condensing anisol at a temperature of about 20° C. with the compound of the formula:

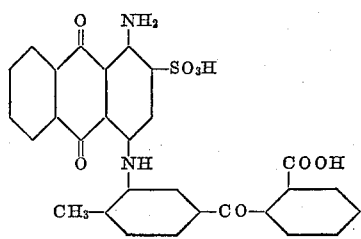

which is dissolved in concentrated sulfuric acid.

5. The process which comprises condensing hydroquinone-di-n-butyl-ether at a temperature of between zero and 25° C. with the compound of the formula:

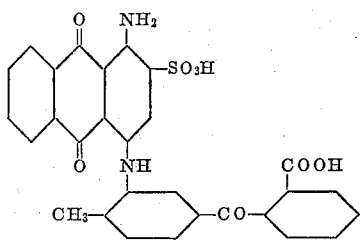

which is dissolved in concentrated sulfuric acid.

6. The compounds of the general formula:

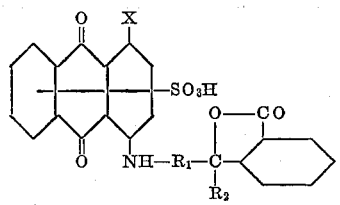

wherein X represents a member of the group consisting of hydrogen and amino, $R_1$ represents an aryl radical of the benzene and diphenyl series, and $R_2$ represents the radical of compounds of the group consisting of aromatic hydrocarbons, their homologues, and alkoxy substitution products.

7. The compounds of the general formula:

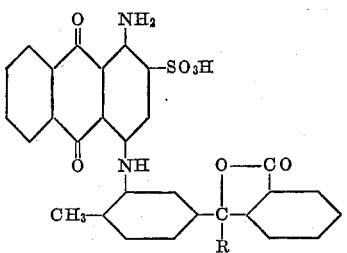

wherein R represents the radical of compounds of the group consisting of aromatic hydrocarbons, their homologues and alkoxy substitution products.

8. The compound of the formula:

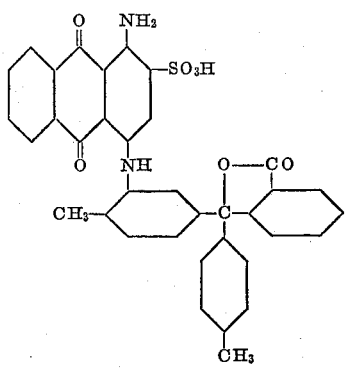

being a dyestuff which dyes wool clear blue tints of very good fastness properties.
9. The compound of the formula:
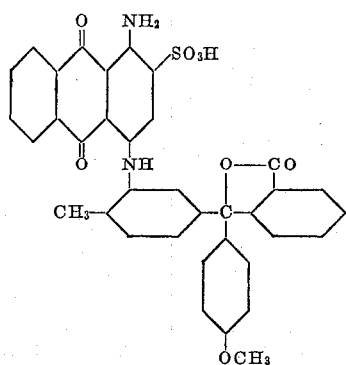
being a dyestuff which dyes wool greenish blue tints with good properties of fastness to water, washing and light.
10. The compound of the formula:
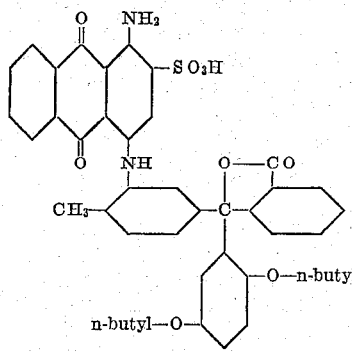
being a dyestuff which dyes wool blue tints of very good fastness properties.
HANS BECKER.